No. 626,008. Patented May 30, 1899.
F. W. PUTNAM.
COMBINED STEP AND GUARD FOR CARRIAGES, &c.
(Application filed Aug. 10, 1898.)
(No Model.)
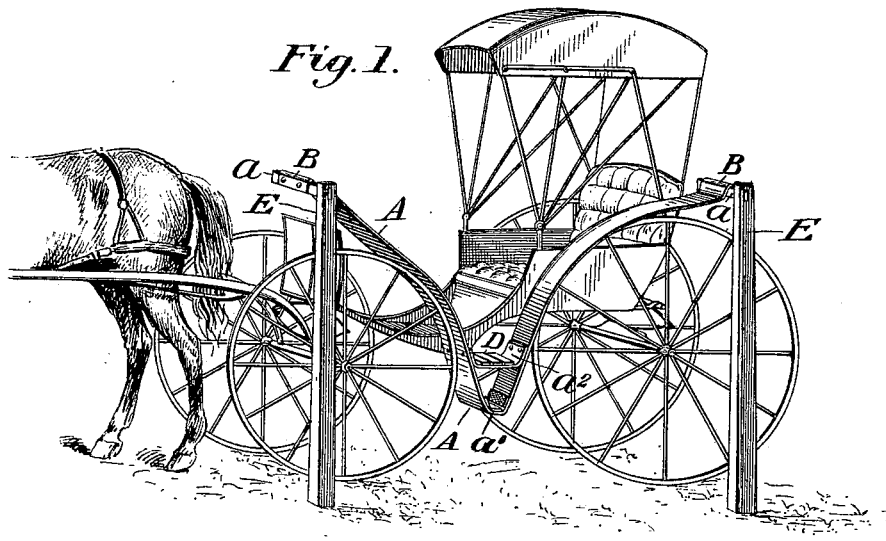
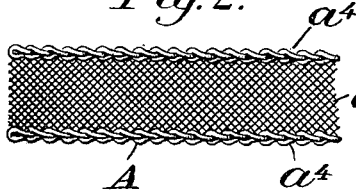
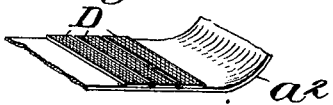
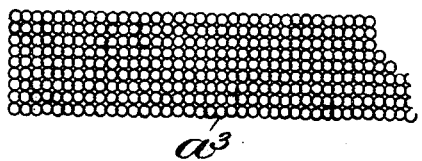
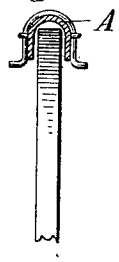
Witnesses
John E. Wentz
H. Gayford
Inventor.
Franklin W. Putnam
THE NORRIS PETERS CO., PHOTO-LITHO., WASHINGTON, D. C.

UNITED STATES PATENT OFFICE.

FRANKLIN W. PUTNAM, OF BINGHAMTON, NEW YORK.

COMBINED STEP AND GUARD FOR CARRIAGES, &c.

SPECIFICATION forming part of Letters Patent No. 626,008, dated May 30, 1899.

Application filed August 10, 1898. Serial No. 688,317. (No model.)

*To all whom it may concern:*

Be it known that I, FRANKLIN W. PUTNAM, a citizen of the United States, residing in the city of Binghamton, county of Broome, and State of New York, have invented a new and useful Combination Step and Guard to Improve the Facilities for Getting Into and Out of Four-Wheeled Vehicles, such as Carriages, Wagons, &c., of which the following is a specification.

My invention covers the entire field of utility now occupied by the stationary steps or stairs called a "horse-block," and also the steps, with or without guards, that are attached to four-wheeled vehicles. I am not aware that any other one invention similar or otherwise covers the same field.

A horse-block affords elevator service only. It necessitates an unnatural insecure plunging step over the wheel to reach the body of the vehicle and affords no protection to the dress from wiping the wheel. The step attached to a vehicle is almost never at the convenient or vantage point, but rather is where the manufacturer was compelled to put it, right or wrong, so as not to interfere with the movements of the vehicle. An athletic man often places one foot on the hub of the wheel and with a straddling swing gains his point, but a woman, for obvious reasons, cannot do this. Even after the driver has thrown the wheels into as favorable a position as possible, with one foot resting just outside of the line of the wheels, in order to gain the step (usually inside the wheel) with the other foot a woman is compelled to make a twisting contortion of her body and lift her weight nearly vertically by main strength while her muscles are in the most disadvantageous position possible.

To overcome the objectionable conditions above mentioned and to furnish a more practical, convenient, and safer way of getting into or out of four-wheeled vehicles is, as before stated, the object of my invention.

Briefly stated, my invention consists in a broad flexible band in combination with a suspensory device that suspends the band over the front and rear wheels on one side of a vehicle, thus forming a guard that protects the dress from contact with the wheel, and at the same time the band drops between the wheels, forming a step, as hereinafter described in detail and by drawings.

Referring to the drawings submitted herewith and which form a part of this specification, Figure 1 gives a perspective view of my invention in combination with a stationary base for public service in place of a horse-block. Figs. 2, 3, 4, and 5 are sectional views and attachments of the band A, Fig. 1.

A is a broad flexible band held in suspension directly over and in contact with a portion of the rims of the front and rear wheels on one side of the vehicle, thus forming a guard that protects the dress from injury by contact with the wheels. The length of the band A and the points of suspension B are so regulated as to cause the band A, which is very flexible, by its own weight and gravity to drop just a sufficient distance between the wheels, whereby the terminal of the bend forms a step $a'$, another step $a^2$ being formed above by attaching a cross-section, Fig. 3.

By the elements flexibility, weight, and gravity that portion of the band A which comes into contact with the wheels acts as a brake on the wheel. In use this brake effect is powerfully augmented by the weight of the person standing on the step, rendering the position at the time one of absolute safety. When the band is made of metal, its adhesiveness for brake purposes may be increased by lining that portion of it which contacts with the wheel with leather, rubber, or other adhesive material. Identically the same elements that cause the band to act as a brake also form a grip on the wheel by throwing the center of the part in contact upward, while the edges are drawn downward in form similar to the letter U inverted. This effect is greater than is shown in the drawings and is increased by the "shaping" device, Fig. 5, hereinafter described. The effect of the grip on the wheel, which is most positive at the point near where the step is formed, is to give firmness and rigidity to the step by preventing a lateral or swinging movement. Neither the brake nor the grip, in fact, no part of the band at any time or in any way, mars or mutilates the wheel, as the contact in reality operates only on the tire.

To the band A may be attached devices that do not interfere with its flexibility, one or more of which serve to "shape" and guide the band, so that it will maintain its proper relation with the wheel at times when the wheels are driven or otherwise thrown out of their proper position. A simple device for this purpose grasps the band at both edges and by contracting its width doubles it into the form of an inverted letter U. (See Fig. 5.) The head of this device may be made, if desired, to project outward in suitable form, so as to furnish a rest or additional step in connection with the rim of the wheel. Another device D, Fig. 3, consists of three or more narrow metal or rubber plates attached as a facing over the step portion of the band A, furnishing a flat secure plane for the foot to stand on, the purpose of employing several instead of one being that the band may deviate in its rise or fall either side of the center without losing a flat plane for the foot in the arc. These plates may be flat on both sides, as shown in the drawings, or the top may be flat and the bottom having a groove or transverse arc in the center for the wheel to travel in, conforming to the shaping device before mentioned.

The flexible band A may be made of any suitable material or combination of materials. The essential element, flexibility, may be inherent in the materials, or it may be constructed by links, joints, hinges, or other device. While I do not limit its construction to any material or combination of materials or design, that which I now deem most practical consists of wire links, substantially as shown in Fig. 4, in combination with heavier links $a^4$, Fig. 2, forming chain edges, substantially as shown in Fig. 2. The width, length, design, materials, and method of constructing the flexible band all may be varied to a considerable extent without affecting its general form or utility for the object claimed.

The "suspensory" device, which is a part of my invention in combination with the flexible band, in all cases is a projecting arm or brace of suitable size, form, strength, and construction that it may easily be attached to or detached from a supporting-base. It must be so constructed that it will suspend the center of the band over the rim of the wheel, allowing free passage of the wheel without the hub contacting with the supporting-base. It may be a simple projecting arm like B, Fig. 1; but I prefer one built more on the principle of a right-angle triangle with an arc brace, the arm to which the band is attached being a spool or windlass with stop attachment, so that the step or center of the band can be easily raised or lowered by winding up or unwinding the band. It is not essential, however, to the utility of the invention that the form or design of the suspensory be limited.

In no case do I claim that the supporting-base to which the suspensory in combination with the flexible band is attached is my invention. It may be natural or constructed plain or ornamental or stationary or portable. In the drawings the posts E, Fig. 1, are placed merely for illustration. They are not a part of my invention.

My invention operates in combination with a stationary base, as follows: The vehicle is driven so that the front wheel enters under the projecting suspensory, (at either end,) lifting the band as the wheel goes forward directly under it. When the wheel has passed sufficiently forward, the band drops into the position shown in Fig. 1 by its own weight and gravity.

For portable use the suspensories are attached to the body of the vehicle, projecting over the wheels the same as when attached to a stationary base. The flexible band is then easily and quickly attached to the projecting arm by hooks, rings, or other simple device, on identically the same plan or principle that a hammock is suspended for use. The suspensories need not be removed or detached; but the band may be detached and placed under the seat or other convenient place the same as other light trappings are disposed of. The band when not in use occupies but small space.

I am aware that prior to my invention a combined step and guard has been made and used, but which differs so entirely from mine in its elements, construction, adaptation, and limitations I deem that it has no relation or interference with mine as an invention. It is a permanent part of a vehicle, the vehicle of which it is a part having to be modeled and constructed especially for its introduction. Once in place its use is thereafter compulsory and limited to one particular vehicle. In no case can it be transferred or substituted for mine. My invention is independent of the base and transferable the same as a hammock. The same "band" is easily and quickly transferable from one base to another, either portable or stationary, without change in its construction or dimensions, also adapting itself to all kinds of four-wheeled vehicles that are not machines.

Having given the object of my invention, the field it covers, and the method of construction in detail, what I claim as new and of my invention, and which I desire to secure by Letters Patent, is—

1. A flexible band held in suspension, by a "suspensory" in combination with a supporting-base, which may be either portable or stationary, and with a carriage, wagon, or other similar vehicle, as a step and guard combined, substantially as described.

2. In combination, a band, flexible longitudinally and transversely, a step or steps, suspensories and supports, all adapted for adjustment to a carriage or vehicle as set forth.

3. A flexible band, having devices attached for shaping and adapting it to practical use, also for steps, in combination with stationary steps and a vehicle as set forth.

FRANKLIN W. PUTNAM.

Witnesses:
JOHN E. WENTZ,
H. J. GAYLORD.